United States Patent
Upadhyay et al.

(10) Patent No.: US 6,895,747 B2
(45) Date of Patent: May 24, 2005

(54) DIESEL AFTERTREATMENT SYSTEMS

(75) Inventors: Devesh Upadhyay, Dearborn, MI (US); Michael Goebelbecker, Dearborn Heights, MI (US); Michiel J. van Nieuwstadt, Ann Arbor, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/301,077

(22) Filed: Nov. 21, 2002

(65) Prior Publication Data

US 2004/0098971 A1 May 27, 2004

(51) Int. Cl.$^7$ ................................................ F01N 3/00
(52) U.S. Cl. ............................ 60/286; 60/274; 60/301
(58) Field of Search .................... 60/274, 286, 299, 60/301, 303; 423/212, 235, 352, 239.1

(56) References Cited

U.S. PATENT DOCUMENTS

| | | | |
|---|---|---|---|
| 4,036,180 A | | 7/1977 | Noguchi et al. |
| 4,112,876 A | | 9/1978 | Mentschel |
| 4,170,200 A | | 10/1979 | Takeuchi et al. |
| 4,222,351 A | | 9/1980 | Kosaka et al. |
| 4,403,473 A | | 9/1983 | Gladden |
| 4,576,617 A | | 3/1986 | Renevot |
| 4,762,093 A | | 8/1988 | McCabe et al. |
| 4,854,123 A | | 8/1989 | Inoue |
| 5,021,227 A | * | 6/1991 | Kobayashi et al. ......... 423/212 |
| 5,201,802 A | | 4/1993 | Hirota et al. |
| 5,209,061 A | | 5/1993 | Takeshima |
| 5,233,934 A | | 8/1993 | Krigmont et al. |

(Continued)

FOREIGN PATENT DOCUMENTS

| | | | |
|---|---|---|---|
| EP | 0487886 | * | 6/1992 |
| WO | WO 99/39809 | | 8/1999 |

OTHER PUBLICATIONS

IMECE–2002–DSC–32104, "Modeling of a Urea SCR Catalyst With Automotive Applications", Devesh Upadhyay, Michiel Van Nieuwstadt, pp. 1–7, Proceedings of ASME-:IMECE, Nov.–17, 2002, New Orleans.
IMECE–2002–DSC–32103, "Control Design of an Automotive Urea SCR Catalyst", Devesh Upadhyay, Michiel Van Nieuwstadt, pp. 1–8, Proceedings of ASME:IMECE, Nov.–17, 2002, New Orleans.
SAE 2001–01–0514, "Advanced Urea SCR Catalysts for Automotive Applications", Gleshoff et al., Detroit, MI, Mar. 5–8, 2001.
SAE 952493, "An Urea Lean NOx Catalyst System for Light Duty Diesel Vehicles", H. Luders et al., Toronto, Ontario, Oct. 16–19, 1995.
SAE 2001–01–3623, "Application of Urea SCR to Light Duty Diesel Vehicles", Lambert et al.

*Primary Examiner*—Thomas Denion
*Assistant Examiner*—Diem Tran
(74) *Attorney, Agent, or Firm*—Julia Voutyras; Allan Lippa (57) ABSTRACT

A method and a system for improving conversion efficiency of a urea-based SCR catalyst coupled downstream of a diesel or other lean burn engine is presented. The system includes an electrically heated vaporizer unit into which a mixture of reductant and air in injected. The mixture is vaporized in the unit and introduced into the exhaust gas prior to its entering the SCR catalyst. Introducing the reductant mixed with air into the reductant delivery system prevents lacquering and soot deposits on the heated element housed inside the unit, and also speeds up the vaporization process thus reducing system response delays and improving the device conversion efficiency. The reductant delivery system is further improved by adding a hydrolyzing catalyst to it, and by isolating the reductant and air mixture from the heating element.

7 Claims, 9 Drawing Sheets

U.S. PATENT DOCUMENTS

| | | | |
|---|---|---|---|
| 5,272,871 A | 12/1993 | Oshima et al. | |
| 5,367,875 A | 11/1994 | Aboujaoude et al. | |
| 5,369,956 A | 12/1994 | Daudel et al. | |
| 5,410,873 A | 5/1995 | Tashiro | |
| 5,412,946 A | 5/1995 | Oshima et al. | |
| 5,426,934 A | 6/1995 | Hunt et al. | |
| 5,428,956 A | 7/1995 | Maus et al. | |
| 5,479,775 A | 1/1996 | Kraemer et al. | |
| 5,522,218 A | 6/1996 | Lane et al. | |
| 5,540,047 A | 7/1996 | Dahlheim et al. | |
| 5,601,792 A * | 2/1997 | Hug et al. | 422/169 |
| 5,609,022 A | 3/1997 | Cho | |
| 5,609,026 A | 3/1997 | Berriman et al. | |
| 5,628,186 A | 5/1997 | Schmelz | |
| 5,643,536 A | 7/1997 | Schmetz | |
| 5,665,318 A | 9/1997 | Rembold et al. | |
| 5,706,652 A | 1/1998 | Sultan | |
| 5,751,602 A | 5/1998 | Maus et al. | |
| 5,771,689 A | 6/1998 | Bareis et al. | |
| 5,806,310 A | 9/1998 | Daidou et al. | |
| 5,809,775 A | 9/1998 | Tarabulski et al. | |
| 5,831,145 A | 11/1998 | Logothetis et al. | |
| 5,842,341 A | 12/1998 | Kibe | |
| 5,845,487 A | 12/1998 | Fraenkle et al. | |
| 5,884,475 A * | 3/1999 | Hofmann et al. | 60/274 |
| 5,884,476 A | 3/1999 | Hirota et al. | |
| 5,893,267 A | 4/1999 | Vogtlin et al. | |
| 5,910,096 A | 6/1999 | Hepburn et al. | |
| 5,921,076 A | 7/1999 | Krutzsch et al. | |
| 5,924,280 A | 7/1999 | Tarabulski | |
| 5,941,067 A | 8/1999 | Hirota et al. | |
| 5,943,858 A | 8/1999 | Hofmann et al. | |
| 5,950,422 A | 9/1999 | Dolling | |
| 5,968,464 A * | 10/1999 | Peter-Hoblyn et al. | 423/235 |
| 6,001,318 A | 12/1999 | Tillaart et al. | |
| 6,003,305 A | 12/1999 | Martin et al. | |
| 6,016,653 A | 1/2000 | Glassey et al. | |
| 6,017,503 A | 1/2000 | Kato et al. | |
| 6,021,640 A | 2/2000 | Hirota et al. | |
| 6,038,854 A | 3/2000 | Penetrante et al. | |
| 6,041,594 A | 3/2000 | Brenner et al. | |
| 6,050,088 A * | 4/2000 | Brenner | 60/303 |
| 6,066,303 A | 5/2000 | Sudduth et al. | |
| 6,079,203 A | 6/2000 | Wakamoto | |
| 6,082,102 A | 7/2000 | Wissler et al. | |
| 6,089,015 A | 7/2000 | Strehlau et al. | |
| 6,119,448 A | 9/2000 | Emmerling et al. | |
| 6,119,451 A | 9/2000 | Vogtlin et al. | |
| 6,122,909 A | 9/2000 | Murphy et al. | |
| 6,122,910 A | 9/2000 | Hoshi et al. | |
| 6,125,629 A | 10/2000 | Patchett | |
| 6,131,388 A | 10/2000 | Sasaki et al. | |
| 6,134,883 A | 10/2000 | Kato et al. | |
| 6,167,698 B1 | 1/2001 | King et al. | |
| 6,171,566 B1 | 1/2001 | Ku et al. | |
| 6,182,443 B1 | 2/2001 | Jarvis et al. | |
| 6,182,444 B1 | 2/2001 | Fulton et al. | |
| 6,192,675 B1 | 2/2001 | Hirota et al. | |
| 6,209,315 B1 | 4/2001 | Weigl | |
| 6,221,324 B1 | 4/2001 | Coq et al. | |
| 6,233,925 B1 | 5/2001 | Hirota et al. | |
| 6,260,353 B1 * | 7/2001 | Takahashi | 60/286 |
| 6,266,955 B1 | 7/2001 | Liang et al. | |
| 6,269,633 B1 | 8/2001 | Van Nieuwstadt et al. | |
| 6,273,120 B1 * | 8/2001 | Hofmann et al. | 137/98 |
| 6,294,141 B1 | 9/2001 | Twigg et al. | |
| 6,299,847 B1 | 10/2001 | Allen | |
| 6,301,879 B1 * | 10/2001 | Weisweiler et al. | 60/274 |
| 6,305,160 B1 | 10/2001 | Hammerle et al. | |
| 6,311,480 B1 | 11/2001 | Suzuki et al. | |
| 6,314,722 B1 | 11/2001 | Matros et al. | |
| 6,314,919 B1 | 11/2001 | Pugachev | |
| 6,357,223 B1 * | 3/2002 | Caren et al. | 60/274 |
| 6,357,226 B2 | 3/2002 | Borland | |
| 6,383,463 B1 | 5/2002 | Mochida et al. | |
| 6,387,336 B2 * | 5/2002 | Marko et al. | 423/212 |
| 6,415,602 B1 | 7/2002 | Patchett et al. | |
| 6,449,945 B1 | 9/2002 | van Nieuwstadt | |
| 6,449,947 B1 * | 9/2002 | Liu et al. | 60/286 |
| 6,470,673 B1 | 10/2002 | Van Nieuwstadt et al. | |
| 6,487,852 B1 | 12/2002 | Murphy et al. | |
| 6,491,885 B1 * | 12/2002 | Tokunaga et al. | 423/212 |
| 6,722,124 B2 * | 4/2004 | Pawson et al. | 60/286 |

* cited by examiner

DIESEL AFTERTREATMENT SYSTEMS

FIELD OF INVENTION

The present invention relates to a system and a method for improving performance of an exhaust gas aftertreatment device, and more particularly to using an air assist heated reductant delivery system to enhance system performance and reduce fuel penalty.

BACKGROUND OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into harmless exhaust gasses. Vehicles equipped with diesel or lean gasoline engines offer the benefits of increased fuel economy. Such vehicles have to be equipped with lean exhaust aftertreatment devices such as, for example, a urea-based Selective Catalytic Reduction (SCR) catalyst, which is capable of continuously reducing NOx emissions, even in an oxygen rich environment. Urea-based SCR catalysts use gaseous ammonia as the active NOx reducing agent. Typically, an aqueous solution of urea is carried on board of a vehicle, and an injection system is used to supply it into the exhaust gas stream. The heat in the exhaust gas causes the aqueous urea solution to decompose into ammonia and hydro-cyanic acid (HNCO). These decomposition products enter the SCR where the gas phase ammonia is adsorbed and the cyanic acid is further decomposed on the SCR to gas phase ammonia. The adsorbed ammonia then takes part in the reduction of gas phase $NO_x$.

The inventors herein have recognized a disadvantage with this approach. Namely, optimum system efficiency is not achieved unless the injected aqueous urea is well distributed and atomized and has sufficient time in the exhaust gas to complete conversion into gaseous ammonia prior to reaching SCR catalyst brick face. The inventors have further recognized that a typical prior art urea injection system is not effective in achieving this because it sends out a directed spray of urea that does not mix well with the exhaust gasses. Further, this spray of urea might impact the catalyst brick directly, thus depositing aqueous urea on it and degrading the catalyst.

SUMMARY OF THE INVENTION

The present invention teaches a system and a method for introducing reductant into a urea based SCR catalyst that overcomes the above-mentioned disadvantages of the prior art.

In accordance with the present invention, a method for controlling a reductant delivery system having at least a heating element, the delivery system coupled upstream of an SCR catalyst, includes: injecting air into the reductant delivery system; injecting reductant into the reductant delivery system; providing an operating temperature for the heated element thereby creating a vaporized mixture of said injected air and said injected reductant; and directing said vaporized mixture into an exhaust gas mixture entering the SCR catalyst.

The present invention provides a number of advantages. In particular, using a heating element in the reductant delivery system supplies sufficient energy for decomposition of urea into HNCO and $NH_3$, even under cold exhaust conditions, thus improving the SCR catalyst's NOx conversion efficiency throughout the drive cycle. Yet another advantage of the present invention is that vaporizing the urea solution improves its mixing and distribution in the exhaust gas. Additionally, the housing around the heated element serves as a deflector for the part of the injected urea spray that escapes impingement on the heated surface thus breaking it up into small particles and further improving its mixing and distribution. Also, using the air-assist heated reductant delivery system reduces the necessary residence time of the urea solution in the exhaust gas, and thus improves the overall system response time.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
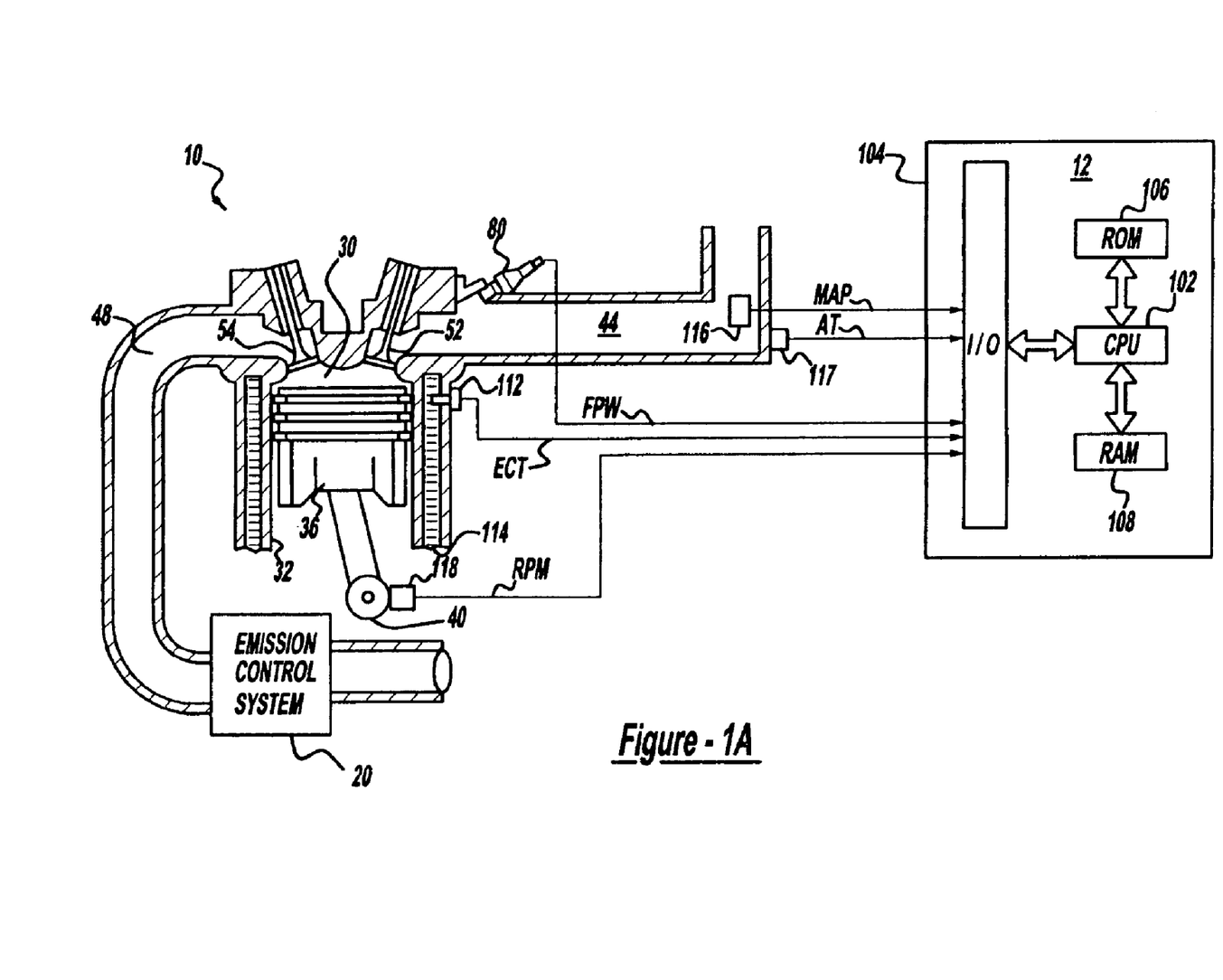
FIGS. 1A and 1B are schematic diagrams of an engine wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown) including a fuel tank, fuel pump, and fuel rail (not shown).

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20, coupled to an exhaust manifold 48, is described in detail in FIG. 2 below.

Figure 1B:
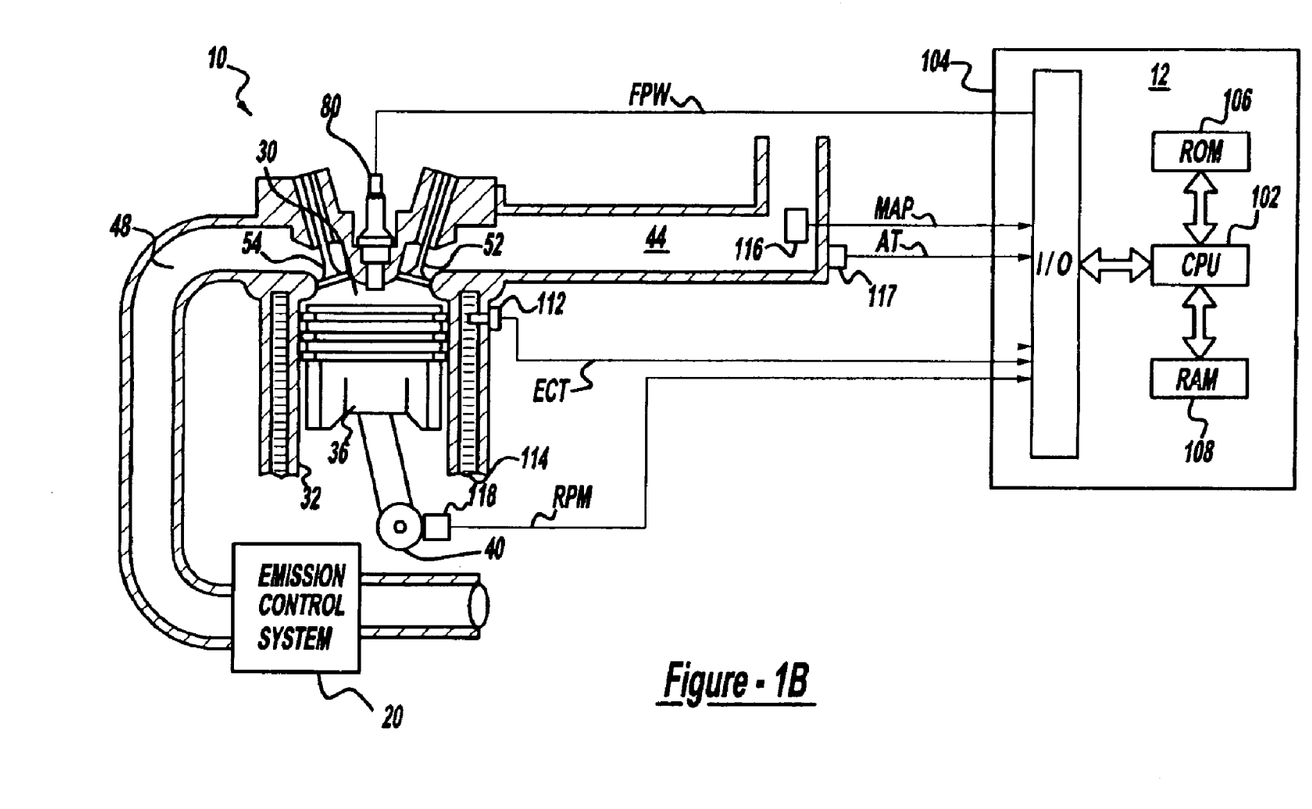

Referring now to FIG. 1B, an alternative embodiment is shown where engine 10 is a direct injection engine with injector 80 located to inject fuel directly into cylinder 30.

Figure 2:
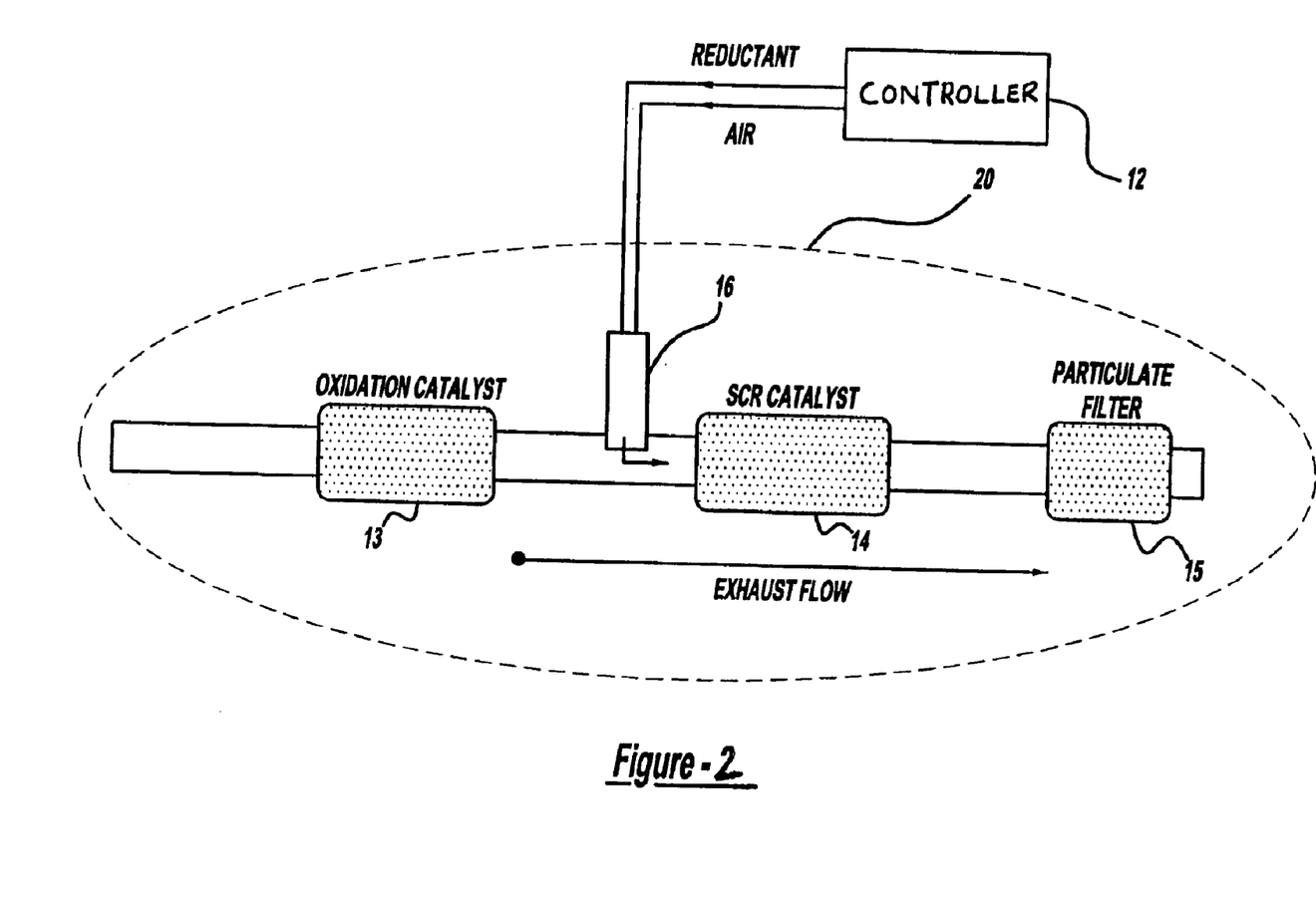
FIG. 2 is a an example of one embodiment of an emission control system wherein the present invention is used to advantage.

Referring now to FIG. 2, an example of an emission control system in accordance with the present invention is described. Emission control system 20 is coupled downstream of an internal combustion engine 10 described with particular reference in FIG. 1.

Catalyst 14 is a urea based Selective Catalytic Reduction (SCR) catalyst in which NOx is reduced through active injection of an aqueous urea solution or other nitrogen-based reductant into the exhaust gas entering the device. The urea solution is converted into hydro cyanic acid (NHCO) and gaseous ammonia ($NH_3$) prior to entering the SCR catalyst, wherein $NH_3$ serves an active NOx reducing agent in the SCR.

In a preferred embodiment, the SCR catalyst is a base metal/zeolite formulation with optimum NOx conversion performance in the temperature range of 200–500° C. Oxidation catalyst 13 is coupled upstream of the SCR catalyst and may be a precious metal catalyst, preferably one containing Platinum for high conversion of hydrocarbons and carbon monoxide. The oxidation catalyst exothermically combusts hydrocarbons (HC) in the incoming exhaust gas from the engine thus supplying heat to rapidly warm up the SCR catalyst 14. Particulate filter 15 is coupled downstream of the SCR catalyst for storing soot.

A reductant delivery system 16 is coupled to the exhaust gas manifold between the oxidation catalyst and the SCR catalyst. Air and reductant are injected into the reductant delivery system, where they are vaporized by the heated element and the resulting vapor is introduced into the exhaust gas mixture entering the SCR catalyst. Alternative embodiments of the reductant delivery system in accordance with the present invention are described later herein with particular reference to FIGS. 3A–3C.

Figure 3A:
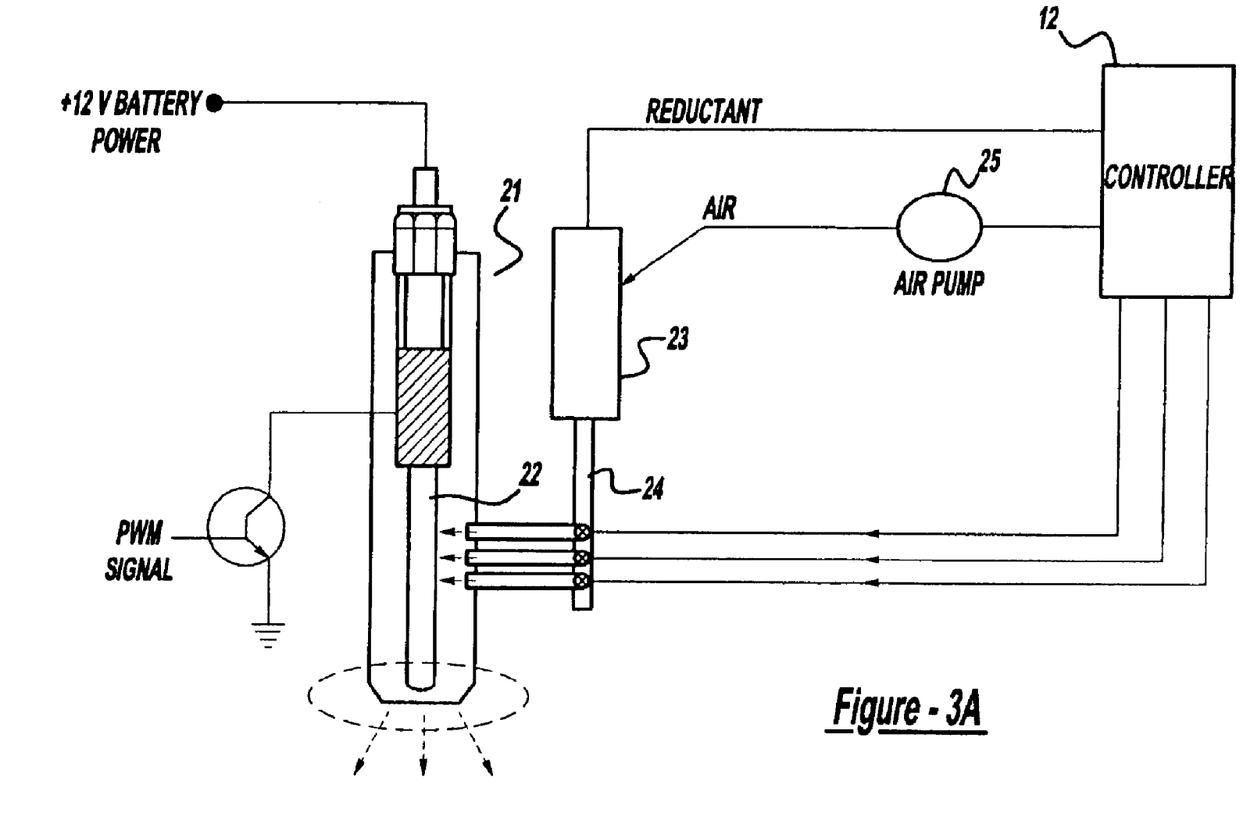
FIGS. 3A, 3B and 3C are examples of reductant delivery systems in accordance with the present invention.

The diagram of FIG. 3A generally represents an example of one embodiment of a reductant delivery system according to the present invention. The system comprises an evaporator unit 21 housing an elongated heating element 22. In this example, the heating element is an electrically heated cylindrically shaped heating element. Alternatively, the heating element could be rectangular shaped to increase its surface contact area with the injected reductant and air mixture.

In yet another alternative embodiment (not shown), a hydrolyzing catalytic coating could be added to the evaporator unit such as, for example, a coating on the inner surface of the heating element housing, or a catalytic cap at the point where the evaporated reductant and air mixture enters the exhaust gas manifold. The close proximity of the hydrolyzing catalyst serves to increase overall $NH_3$ production by converting HNCO to $NH_3$. Controller 12 controls the temperature of the heating element by providing a PWM signal of varying duty cycles. The duty cycle of the PWM control signal to the heating element is determined from a prestored table based on operating conditions to achieve desired heating element temperature to optimally vaporize/decompose the injected urea. Mixing unit 23 has a reductant inlet and an air inlet and an outlet 24 coupled to the evaporator unit 21 through which a mixture of reductant and air is injected into the housing and subsequently comes into contact with the surface of the heating element 22.

In an alternative embodiment (not shown); both air and reductant can be injected through a single input. The reductant is metered out by a pump through a control valve, where both the pump and the valve are controlled by controller 12. Air pump 25 supplies pressurized air to the mixing unit 23 thereby creating a mixture of reductant and air. Outlet 24 is configured to deliver the reductant and air mixture to more than one area on the surface of the heating element. Controller 12 can selectively enable and disable injection of the mixture to these areas depending on operating conditions, such as engine speed, load, exhaust gas temperature, etc. For example, when the amount of reductant required is high, such as at high load conditions, it may be necessary to enable delivery of the reductant and air mixture to more than one area on the surface of the heating element. Alternatively, outlet 24 may be configured to deliver the reductant and air mixture to a specific area on the surface of the heating element.

Figure 3B:
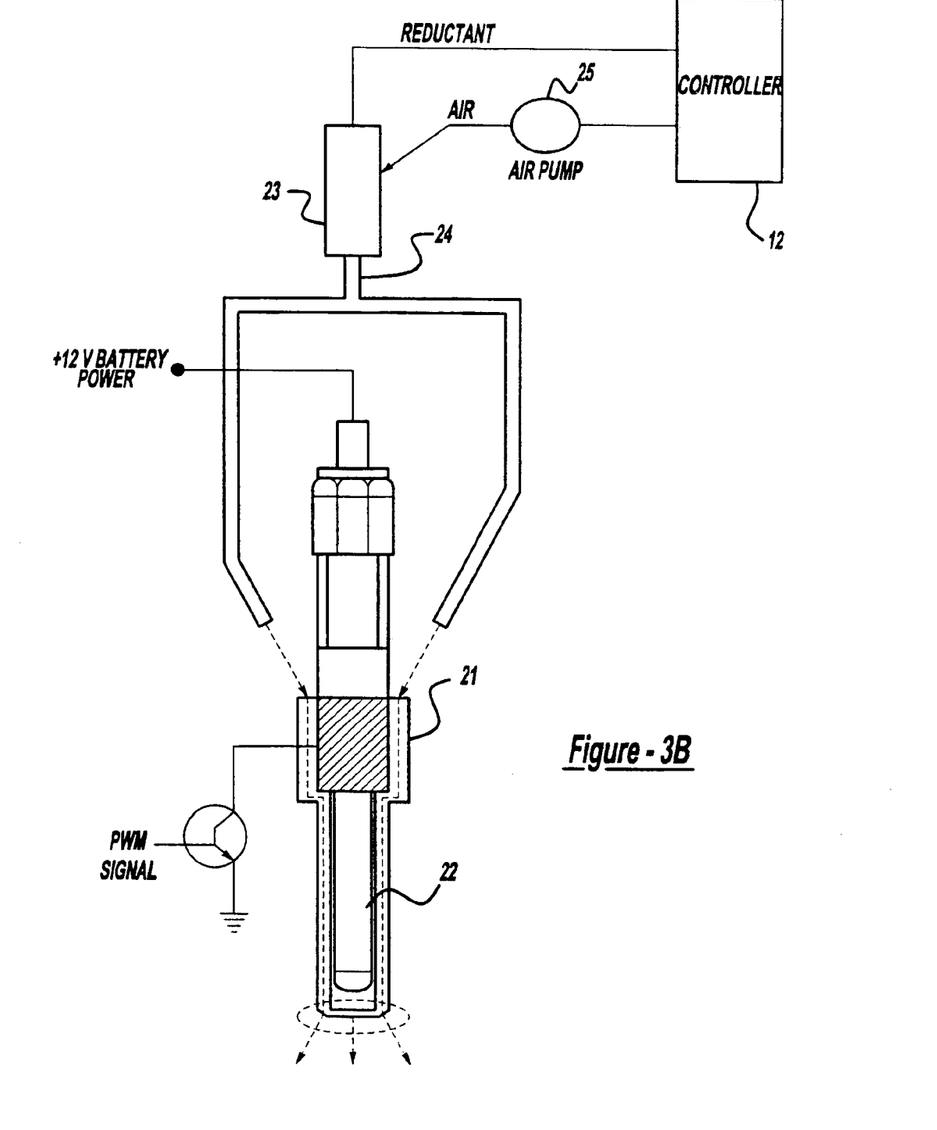

FIG. 3B shows an alternate design for the heating element housing As can be seen in the drawing, the heating element is surrounded by a delivery tube the inner diameter of which is wide enough to allow the heating element to be housed. The delivery tube has a narrow channel drilled into it, which serves as a passage for the air and reductant mixture. The air and reductant mixture is injected into the narrow channel and is rapidly vaporized by the heat provided by the enclosed heating element without coming into direct contact with its surface. In this embodiment, the durability of the heating element is further improved since the reductant and air mixture never comes into direct contact its surface, and thus lacquering and soot settlement does not occur The delivery tube has one or more holes at its tip through which the vaporized reductant and air mixture enters the exhaust gas manifold.

Figure 3C:
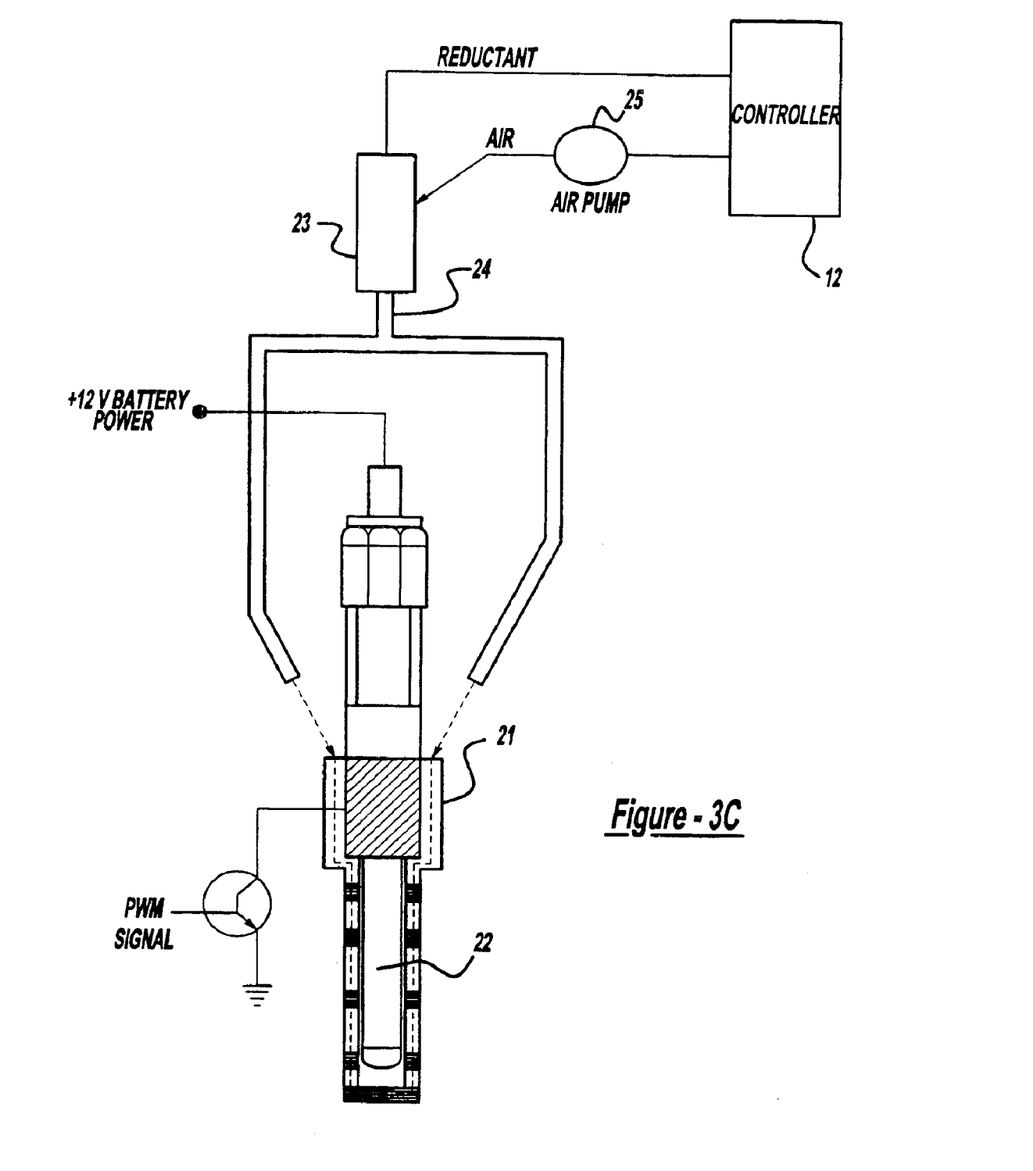

FIG. 3C shows yet another alternative embodiment of the heating element housing shown in FIG. 3B wherein a porous hydrolyzing catalytic plug is placed at the tip of the delivery tube and one or more ports are drilled into the delivery tube along its length and plugged up with porous hydrolyzing catalytic material to facilitate $NH_3$ production.

Therefore, NOx conversion efficiency of a urea-based SCR catalyst can be increased by using a reductant delivery system according to the present invention wherein a mixture of urea and air is injected into the system, and is vaporized by the heat generated by the heated element. Supplying reductant and air mixture in a vapor form ensures that it is well mixed with the exhaust gasses entering the SCR catalyst, and therefore high levels of urea conversion to $NH_3$ and HNCO are achieved prior to entering the catalyst. An additional advantage is achieved by the fact the catalyst does not get contaminated by urea deposits on its front brick.

In a preferred embodiment, the reductant delivery system also includes a hydrolyzing catalyst placed in the path of the vaporized reductant and air mixture prior to its mixing with the exhaust gasses, which further facilitates $NH_3$ generation.

As will be appreciated by one of ordinary skill in the art, the routine described in FIGS. 4 and 5 below may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Figure 4:
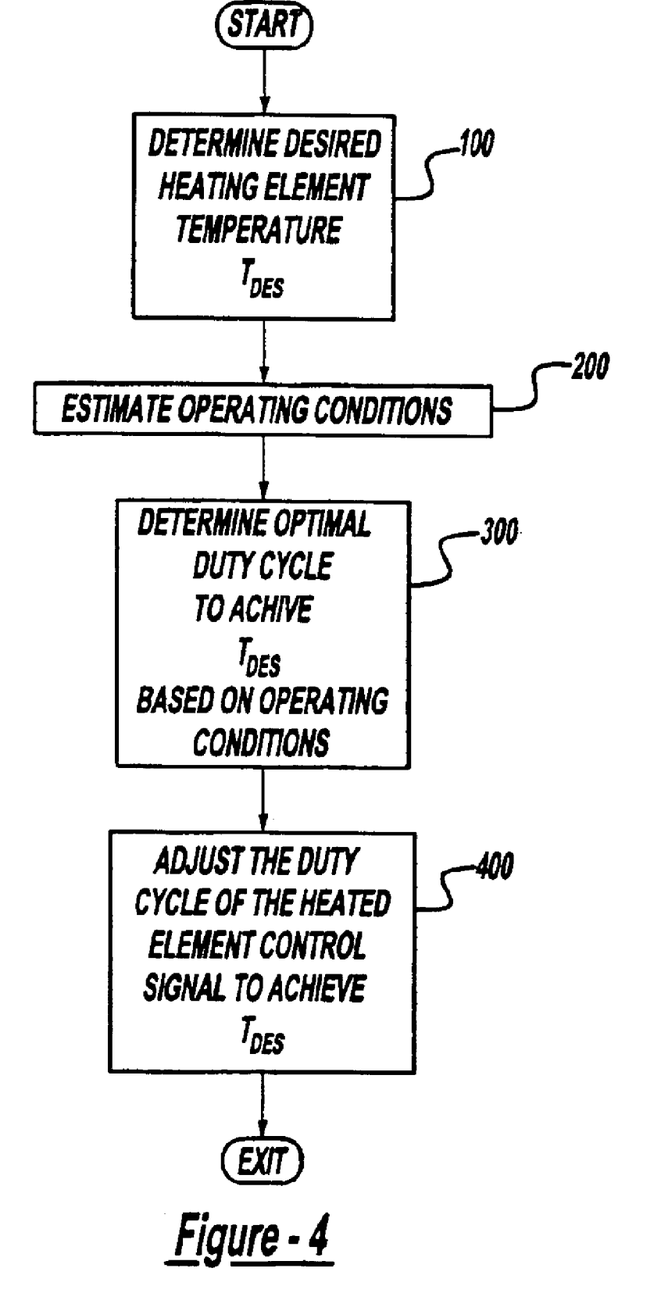
FIG. 4 is a high level flowchart of an exemplary routine for controlling a temperature of a heating element in accordance with the present invention.

Referring now to FIG. 4, an exemplary routine for controlling the temperature of the heating element of the reductant delivery system in accordance with the present invention is described. First, in step 100, desired heating element temperature, $T_{des}$, is determined. This determination is based on what function the reductant evaporator system is performing such as whether the mixture is to be evaporated or combusted. Next, the routine proceeds to step 200 wherein operating conditions known to have an effect on the heating element temperature, such as the exhaust gas temperature upstream of the ALNC, are evaluated. The exhaust gas temperature can be determined from a temperature sensor coupled in the exhaust gas manifold, or estimated based on parameters such as engine speed, load, engine temperature, ignition timing, etc. Next, in step 300, optimal duty cycle to achieve desired heating element temperature is determined from a prestored experimentally determined temperature map of the heating element based on operating conditions such as the exhaust gas temperature in this example. The routine then proceeds to step 400 wherein the duty cycle of the heating element control signal is adjusted to achieve desired heating element temperature. The routine then exits.

Therefore, by generating a map of the heating element temperature based on operating conditions, such as the exhaust gas temperature, or any parameter known to affect the temperature of the heated element, it is possible to dynamically control the temperature of the heated element to achieve optimal reductant and air mixture delivery while minimizing power consumption and preventing overheating of the heating element. In other words, it is possible to take advantage of the heat provided by the exhaust gas passing through the reductant delivery system when controlling the temperature of the heating element. For example, higher exhaust gas temperature result in less power requirements, while lower exhaust gas temperatures result in higher power requirements. It is also possible to completely turn off power supply when the exhaust gas temperature is high enough to keep the heating element at desired temperature such as at high engine load conditions.

Figure 5:
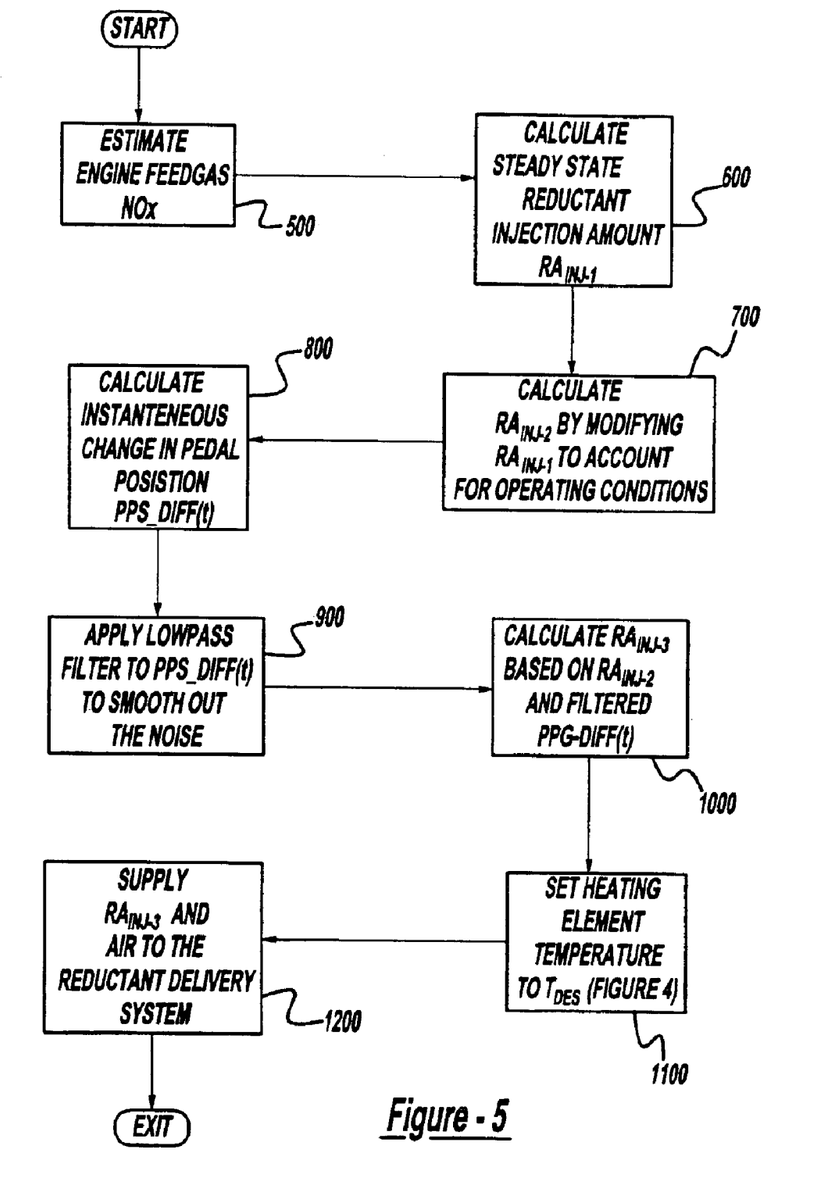
FIGS. 5 and 6 describe an exemplary routine and a modification curve for determining an amount of reductant to be delivered to the exhaust gas aftertreatment device in accordance with the present invention.

Referring now to FIG. 5, an exemplary routine for controlling injection of a reductant into exhaust flow using a reductant vaporizer system as described in FIG. 3A is presented. First, in step 500, the amount of NOx in the exhaust gas mixture entering the device, $NOx_{fg}$, is estimated based on engine operating conditions. These conditions may include engine speed, engine load, exhaust temperatures, exhaust gas aftertreatment device temperatures, injection timing, engine temperature, and any other parameter know to those skilled in the art to indicate the amount of NOx produced by the combustion presses. Alternatively, a NOx sensor may be used to measure the amount of NOx in the exhaust gas mixture. Next, in step 600, the steady-state reductant injection amount, $RA_{inj\_1}$, is calculated based on the following equation:

$$\frac{(RA_{fg} + RA_{inj\_1})}{NOx_{fg}} = R_{des}$$

wherein $RA_{fg}$ is the amount of reductant in the exhaust gas mixture entering the device, which can be determined based on engine operating conditions. This initial reductant amount, $RA_{inj\_1}$, is evaluated at steady state and yields a base reductant quantity to be injected for each engine speed and load point. The amount is calibrated to achieve a certain feedgas reductant to NOx ratio, $R_{des}$. The ratio is typically obtained as a trade-off between NOx conversion and the fuel penalty due to reductant injection, and in this example is set at approximately 10. Next, in step 700, the steady-state base reductant injection amount, $RA_{inj\_1}$, is modified to account for engine operating conditions, such as engine coolant temperature, $T_c$, exhaust gas temperature, $T_{eg}$, EGR valve position, $EGR_{pos}$, start of injection, SOI, and other parameters:

$$RA_{inj\_2} = RA_{inj\_1} \cdot f_1(T_c) \cdot f_2(T_{eg}) \cdot f_3(SOI) \cdot f_4(EGR_{pos})$$

Figure 6:
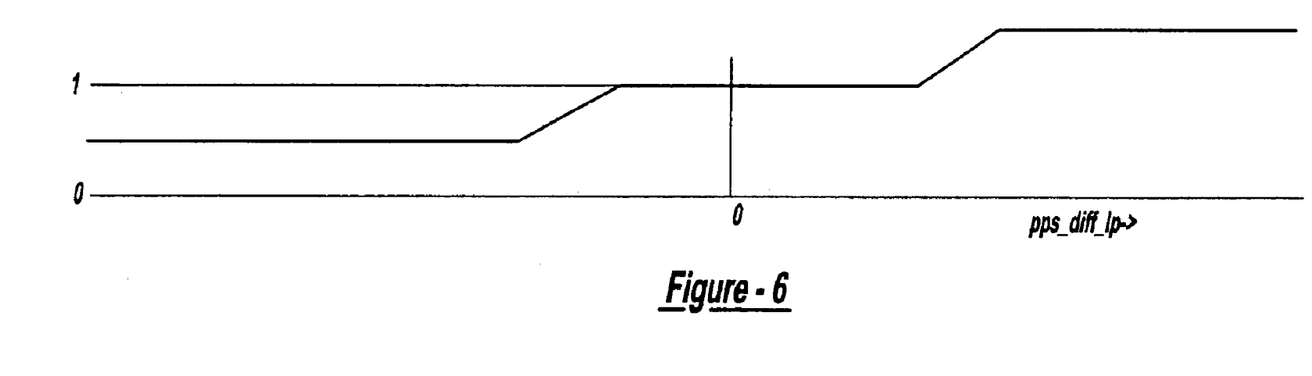

The routine then proceeds to step 800 wherein the instantaneous change in the pedal position is computed as follows:

$$pps\_diff(t) = \frac{(pps(t) - pps(t-1))}{T_s}$$

where $T_s$ is the sampling rate, and pps(t) denotes the pedal position at time t. Next, in step 900, a low pass filter is applied to smooth out the noise:

$$pps\_diff\_lp(t) = (1-k_f) \cdot pps\_diff\_lp(t-1) + k_f pps\_diff(t-1)$$

where $k_f$ controls the rate of filtering. The routine then proceeds to step 1000 wherein the reductant amount is further modified to account for engine transient behaviors as represented by the changes in the pedal position:

$$RA_{inj\_3} = RA_{inj\_2} \cdot f_5(pps\_diff\_lp)$$

where function $f_5$ is shaped to allow overinjection of reductant during pedal position tip-in and underinjection of reductant during pedal position tip-out. In an alternative embodiment, instead of pedal position, engine speed or fuel demand sensor, or any other parameter known to those skilled in the art to provide a measure of engine transient behavior may be used to obtain $RA_{inj\_3}$. Next, in step 1100, the desired temperature of the heating element is obtained as described with particular reference to FIG. 4, thus achieving optimum temperature for reductant and air mixture evaporation. The routine then proceeds to step 1200 wherein the areas on the surface of the heating element to which a reductant and air mixture is injected are selected based on operating conditions. These areas are selected from a prestored map based on such parameters as the amount of reductant to be delivered, engine load, speed, exhaust gas temperature, catalyst temperature, throttle position, etc. For example, at high engine loads it may be desirable to inject the reductant and air mixture faster than at low engine loads, and delivery to more than one area will therefore be enabled. The routine then exits. An example of $f_5$ is shown with particular reference to FIG. 6.

Therefore, according to the present invention, in order to achieve more efficient exhaust gas aftertreatment device performance, the amount of reductant to be injected should be adjusted to account for increases and decreases in the amount of NOx in the exhaust gas entering the device. This can be accomplished by continuously monitoring engine parameters that are capable of providing a measure of engine transient behaviors, such as a pedal position sensor, and continuously adjusting the amount of reductant to be injected as a function of filtered instantaneous changes in these parameters. Since NOx production typically increases at tip-in and decreases at tip-out, the result of such operation would be to increase the base injected amount in the former case, and decrease the base injected amount in the latter case. Further, using a reductant vaporizer unit ensures fast system response, more efficient system operation, better emission control, and improved fuel economy.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for controlling a reductant delivery system having at least a heating element and a mixing unit, the delivery system coupled upstream of an SCR catalyst, the method comprising:
    injecting air into the mixing unit;
    injecting reductant into the mixing unit;
        providing an operating temperature for the heating element; and
    directing a spray of a mixture of said air and reductant from said mixing unit onto said heating element, said heating element vaporizing said spray into an exhaust gas mixture from an internal combustion piston engine, said exhaust gas mixture entering the SCR catalyst, wherein said reductant includes urea.

2. The method as set forth in claim 1 wherein the heating element is housed inside a housing, and said mixture spray is injected into said housing, and subsequently comes into contact with a surface of the heating element.

3. The method as set forth in claim 2 wherein the heating element is an electrically heated heating element.

4. The method as set forth in claim 2 wherein an inner surface of said housing is coated with a hydrolyzing catalyst.

5. The method as set forth in claim 2 wherein a hydrolyzing catalyst is placed in the path of said vaporized mixture of said reductant and said air.

6. The method as set forth in claim 1 wherein the heating element is housed inside a housing, wherein the housing deflects part of the directed mixture spray.

7. The method as set forth in claim 1 wherein said directed mixture spray impinges on a heated surface of the heating element.

* * * * *